(12) United States Patent
Lam et al.

(10) Patent No.: US 7,755,011 B2
(45) Date of Patent: Jul. 13, 2010

(54) TARGET MANEUVER DETECTION

(75) Inventors: Vincent C. Lam, Grand Prairie, TX (US); David L. Quam, Colleyville, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 446 days.

(21) Appl. No.: 11/426,099

(22) Filed: Jun. 23, 2006

(65) Prior Publication Data

US 2007/0295855 A1    Dec. 27, 2007

(51) Int. Cl.
| | |
|---|---|
| *G01S 13/66* | (2006.01) |
| *G01S 17/66* | (2006.01) |
| *F41G 9/00* | (2006.01) |
| *G01S 13/00* | (2006.01) |
| *G01S 17/00* | (2006.01) |
| *F42B 15/00* | (2006.01) |

(52) U.S. Cl. .................. 244/3.1; 244/3.15; 89/1.11; 342/61; 342/62; 342/175; 342/195; 382/103

(58) Field of Classification Search ........... 244/3.1–3.3; 89/1.11; 342/52–68, 175, 192–197; 382/103; 340/988, 989; 702/127, 189–191, 193; 701/1, 701/3, 23–28, 34, 200, 205, 207, 213, 223, 701/224, 300, 301
See application file for complete search history.

(56) References Cited

U.S. PATENT DOCUMENTS

| | | | | |
|---|---|---|---|---|
| 3,982,713 | A * | 9/1976 | Martin | 244/3.1 |
| 4,008,869 | A * | 2/1977 | Weiss | 244/3.13 |
| 4,111,382 | A * | 9/1978 | Kissinger | 244/3.1 |
| 5,068,656 | A * | 11/1991 | Sutherland | 340/989 |
| 5,379,966 | A * | 1/1995 | Simeone et al. | 244/3.11 |
| 5,458,041 | A * | 10/1995 | Sun et al. | 89/1.11 |
| 5,464,174 | A * | 11/1995 | Laures | 244/3.11 |
| 5,637,826 | A * | 6/1997 | Bessacini et al. | 244/3.11 |
| 6,259,974 | B1 * | 7/2001 | Bessacini et al. | 244/3.15 |
| 6,301,532 | B1 * | 10/2001 | Kull et al. | 701/34 |

(Continued)

FOREIGN PATENT DOCUMENTS

GB        2277844 A    * 11/1994

(Continued)

OTHER PUBLICATIONS

"Maneuver Detection Using the Radar Range Rate Measurement", manuscript received Jan. 2, 2003; revised May 23, 2003 and published Oct. 28, 2003.

(Continued)

*Primary Examiner*—Bernarr E Gregory
(74) *Attorney, Agent, or Firm*—Williams, Morgan & Amerson, P.C.

(57) ABSTRACT

The present invention includes, in its various aspects and embodiments, a method and apparatus for determining whether a moving target is maneuvering. The method comprises determining an expected motion for the target assuming the target is not maneuvering; determining an upper bound and a lower bound for the expected motion; and determining whether the actual motion exceeds at least one of the upper and lower bounds of the expected motion. In one aspect, the apparatus is a program storage medium encoded with instructions that, when executed by a computing apparatus, perform such a method. In another aspect, the apparatus is a computing apparatus programmed to perform such a method.

45 Claims, 3 Drawing Sheets

U.S. PATENT DOCUMENTS 6,672,533 B1 * 1/2004 Regebro .................. 244/3.13
6,672,534 B2 * 1/2004 Harding et al. ............ 244/3.15
6,859,765 B2 * 2/2005 Gotkis et al. .............. 702/193
6,997,097 B2 * 2/2006 Harding .................... 89/1.11

FOREIGN PATENT DOCUMENTS

GB       2343071 A  *  4/2000

OTHER PUBLICATIONS

"Manoeuvre Detection and Track Correction by Input Estimation", by Chan and Couture, IEE Proceedings—F, vol. 140, No. 1, Feb. 1993.

"Target Maneuver Detection and Estimation" by Williams and Friedland, Proceeding of the 27$^{th}$ Conference on Decision and Control, Dec. 1998.

* cited by examiner

TARGET MANEUVER DETECTION

BACKGROUND OF THE INVENTION

1. Field of the Invention

The present invention is directed to targeting, and, more particularly, to target maneuver detection.

2. Description of the Related Art

There is a need to determine when target maneuvering starts because target state extrapolations are different for non-maneuvering targets versus maneuvering targets. There are several methods available for target maneuver detection, including using:

(i) a nonlinear target maneuver detection and estimation algorithm, Williams, D. E. and Friedland, B., "Target Maneuver Detection and Estimation," *Proceedings of the 27th IEEE Conference on Decision and Control*, Vol. 1, pp. 851-855 (1988), which is a two-step procedure using both separate-bias and non-gaussian random transition theory, Friedland, B., "Treatment of Bias in Recursive Filtering," *IEEE Transactions on Automatic Control*, Vol. 14, Issue 4, pp. 359-367 (1963).

(ii) the input estimation method of tracking a maneuvering target, Chan, Y. T. and Couture, F., "Manoeuvre Detection and Track Correction by Input Estimation," *IEEE Proceedings of Radar and Signal Processing*, Vol. 140, Issue 1, pp. 21-28 (1993).

(iii) a range rate measurement of target acceleration under a constant turning rate model. Bizup, D. F. and Brown, D. E. [2004], "Maneuver Detection Using the Radar Range Rate Measurement," *Transactions on Aerospace and Electronic Systems*, Vol. 40, Issue 1, pp. 330-336 (2004); Koteswara Rao, S. [2005], "Target Maneuver Detection Algorithm," *Proceedings of the International Conference on Intelligent Sensing and Information Processing*, pp. 52-55, which will work for constant turning rate only.

The present invention is directed to resolving, or at least reducing, one or all of the problems associated with the approaches mentioned above.

SUMMARY OF THE INVENTION

The present invention includes, in its various aspects and embodiments, a method and apparatus for determining whether a moving target is maneuvering. The method comprises determining an expected motion for the target assuming the target is not maneuvering; determining an upper bound and a lower bound for the expected motion; and determining whether the actual motion exceeds at least one of the upper and lower bounds of the expected motion. In one aspect, the apparatus is a program storage medium encoded with instructions that, when executed by a computing apparatus, perform such a method. In another aspect, the apparatus is a computing apparatus programmed to perform such a method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
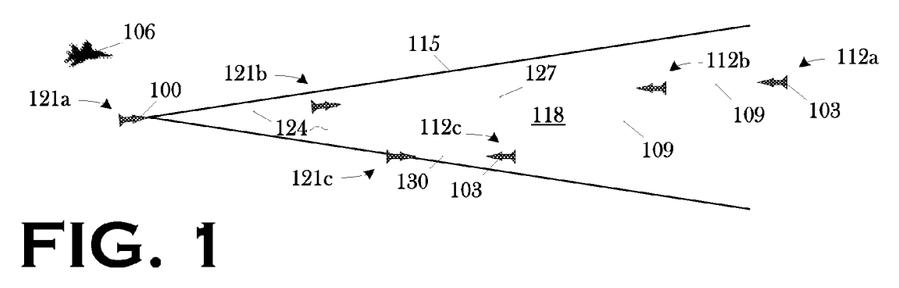
FIG. 1 illustrates a scenario in which the present invention is employed aboard a platform to detect a maneuver by a target.

FIG. 1 depicts a platform 100 seeking to determine whether a target 103 is maneuvering in accordance with the present invention. The platform 100 is a missile, and, more particularly, an air-to-air missile deployed from the aircraft 106. Note that the invention is not limited by the manner in which the platform 100 is deployed. The platform 100 may be deployed in alternative embodiments from, for example, a ground-based launcher or a naval vessel. The target 103 is also a missile. However, the invention is not limited to the implementation of the platform 100 or target 103 shown in FIG. 1. The invention admits wide variation in the implementation of the platform 100 and target 103, as will be discussed further below.

Figure 2:
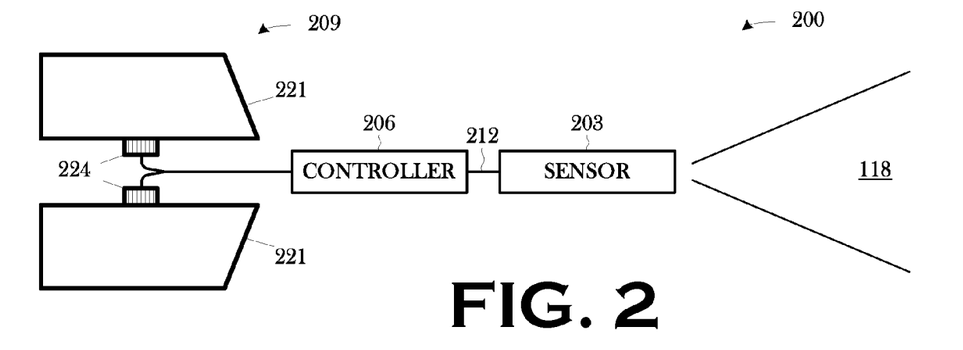
FIG. 2 depicts the detection of the target designation and control of the flight control mechanisms of the platform first shown in FIG. 1.

FIG. 2 conceptually depicts a selected portion 200 of the command and control ("2C") architecture of the platform 100 relative to the present invention and its operation. The portion 200 depicts a sensor 203, a controller 206, and a flight control mechanism 209. Note that, as will be appreciated by those skilled in the art having the benefits of this disclosure, the 2C architecture of the platform 100 is much more complex and involved. However, details unrelated to the present invention have been omitted for the sake of clarity and so as not to obscure the present invention.

The invention admits wide variation in the implementation of the sensor 203, depending on the remote sensing technology used. For instance, various embodiments may use radio (e.g., radio detection and ranging, or "RADAR"), optical (e.g., laser detection and ranging, or "LADAR"), or infrared ("IR") technologies. Similarly, the remote sensing may be active (i.e., detecting radiation originating on-board the platform 100); semi-active (i.e., detecting radiation originating from a source off-board the platform 100); or passive (i.e., detecting radiation originating from the target). The sensor 203 accordingly may be a receiver or a transmitter/receiver ("transceiver") depending on the implementation.

Typically, however, the illustrated embodiment will employ a passive RADAR remote sensing approach. The sensor 203 is therefore, in the illustrated embodiment, a RADAR receiver. However, alternative embodiments may use any suitable sensor known to the art. The identification and selection of a suitable implementation for the sensor 203 for any given embodiment will readily be within the ordinary skill of those in the art having the benefit of this disclosure.

Figure 3:
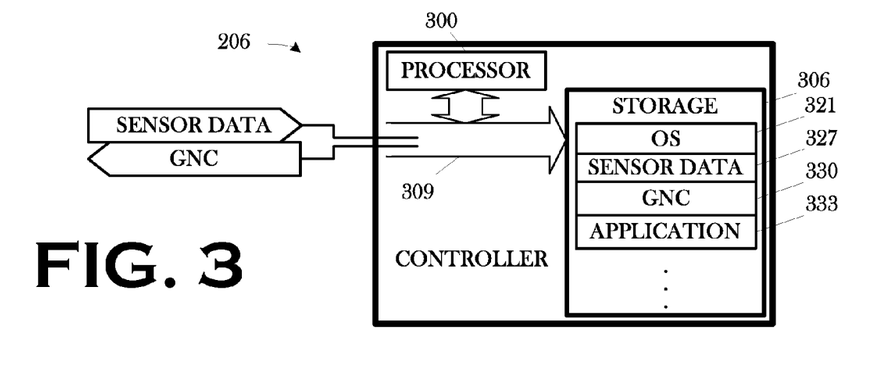
FIG. 3 depicts a controller first shown in FIG. 2 on board the platform of FIG. 1.

The controller 206 receives the output 212 of the sensor 203 and processes it in accordance with the present invention. In the illustrated embodiment, the controller 206 also outputs guidance navigation control ("GNC") commands to the flight control mechanism 209 of the platform 100 in accordance with its mission profile. FIG. 3 depicts selected portions of the controller 206, first shown in FIG. 2, in a block diagram. The controller 206 includes a processor 300 communicating with storage 306 over a bus system 309. Each of these components will now be discussed in turn.

The processor 300 may be any suitable processor known to the art. In general, the controller 206 will handle a fair amount of data, some of which may be relatively voluminous by nature and which is processed quickly. Thus, certain types of processors may be more desirable than others for implementing the processor 300. For instance, a digital signal processor ("DSP") may be more desirable for the illustrated embodiment than will be a general purpose microprocessor. In some embodiments, the processor 300 may be implemented as a processor set, such as a microprocessor with a mathematics co-processor.

The storage 306 may be implemented in conventional fashion and may include a variety of types of storage, such as a hard disk and/or random access memory ("RAM"). The storage 306 will typically involve both read-only and writable memory implemented in disk storage and/or cache. Parts of the storage 306 will typically be implemented in magnetic media (e.g., magnetic tape or magnetic disk) while other parts may be implemented in optical media (e.g., optical disk). The present invention admits wide latitude in implementation of the storage 306 in various embodiments.

The storage 306 is also encoded with a variety of software components, including an operating system 321, the sensor data 327, a guidance navigation control ("GNC") component 330, and a software application 333. That is, these software components "reside" on the storage 306. The processor 300 runs under the control of the operating system ("OS") 321, which may be practically any operating system known to the art. The controller 206 receives the sensor data 327 from the sensor 203 (shown in FIG. 2) and stores it on the storage 306. The sensor data 327 may be stored in any suitable type of data structure known to the art, such as first-in, first-out ("FIFO") queue. The GNC component 330 issues suitable GNC commands to the flight control mechanism 209 in accordance with the mission profile upon application of the method of the invention. The nature of the GNC commands will be dependent on the implementation of the flight control mechanism 209, which is further discussed immediately below.

Returning to FIG. 2, the flight control mechanism 209 is shown as comprising a plurality of flight control surfaces 221—i.e., fins—and their actuators 224. As will be appreciated by those in the art having the benefit of this disclosure, many types of flight control mechanisms may be employed. Many of these types, such as fins and canards, employ flight control surfaces. Others do not, however. For instance, some weapons might employ thrusters in addition to or in lieu of flight control surfaces. The invention is not limited by the nature of the flight control mechanism employed. Similarly, the number of components within the flight control mechanism 209 is not material. For instance, the platform 100 might employ three, four, or more flight control surfaces 221 or as many as 12 thrusters. Furthermore, the flight control mechanism 209 may be located aft (as shown), forward, or both aft and forward of the platform 100, depending in the implementation. Thus, the flight control surfaces 221 are, by way of example and illustration, but one means for controlling the flight of the platform 100 in accordance with the present invention.

A software application 333 also resides on the storage 306. The software application 333 analyzes the sensor data 327 employing the method of the invention to detect whether the target 103 has initiated a maneuver. In the illustrated embodiment, if the software application 333 detects a maneuver, the software application 333 notifies the GNC component 330. The GNC component 330 then issues commands to the flight control mechanism 209 to alter the heading of the platform 100 to maintain an intercept course with the target 103. The software application 333 may constitute a constituent part of the GNC component 330 in some embodiments, or may constitute a stand alone software component interfaced with the GNC component 330.

As is apparent from the discussion above, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Note that the use of the determination of the software application 333 that a maneuver has been initiated by the target 103 will be implementation specific. In the illustrated embodiment, the platform 100 is a missile attempting to intercept the target 103, also a missile. Consequently, the determination is used to control the flight path of the platform 100 to maintain an intercept course with the target 103. However, other embodiments may put the determination to other uses. Such alternative embodiments are presented below to demonstrate the versatility of the present invention.

In FIG. 1, the target 103 is proceeding along a flight path 109, shown in broken lines. The target 103 is shown at three different points 112a-112c on the flight path 109. The platform 100 is remotely sensing the position of the target 103 as it moves along the flight path through the positions 112a-112c, as indicated by the cone 115 illustrating the sensed field of view 118 for the platform 100. The platform 100 also employs the present invention as it senses the target 103 traversing the flight path 109. Note that the target 103 initiates a maneuver at the point 112b to arrive at the point 112c. It is just such a maneuver that the platform 100 employs the present invention to detect. The platform 100 is shown at three points 121a-121c, corresponding to the points 112a-112c of the target 103 in a manner described more fully below. The platform 100 is shown at the points 121a, 121b on a heading 127 and at the point 121c on a heading 130 to intercept the target 103.

More particularly, the platform 100 remotely senses the position of the target 103 over time as it traverses the flight path 109, as mentioned above. The platform 100, and, more particularly, the software application 333 (FIG. 3) of the controller 206 (FIG. 2), applies the method 400 of the present invention, shown in FIG. 4. For purposes of illustrating the present invention, its application will be described at the points 112a-112c for the target 103 and the respective points 121a-121c for the platform 100.

At the point 112a, the target 103 is proceeding along the flight path 109. The platform 100, at the point 121a, remotely senses the target 103 and applies the method 400, of FIG. 4, to determine whether the target 103 is initiating a maneuver. The method 400 begins by determining (at 403) an expected motion for the target 103 assuming the target 103 is not maneuvering. In the scenario of FIG. 1, the expected motion is the motion that will occur in the absence of a maneuver, i.e., the target 103 will continue along the flight path 109. Essentially, the platform 100 extrapolates from the point 112a where the target 103 will go in the absence of a maneuver. Two embodiments will be disclosed further below in which the expected motion is determined from the acceleration and the flight path angular rates, respectively, of the sensed, current motion of the target 103. The current motion is determined from a target measurement filter, e.g., a Kalman filter, such as is well known and commonly employed in the art.

Figure 4:
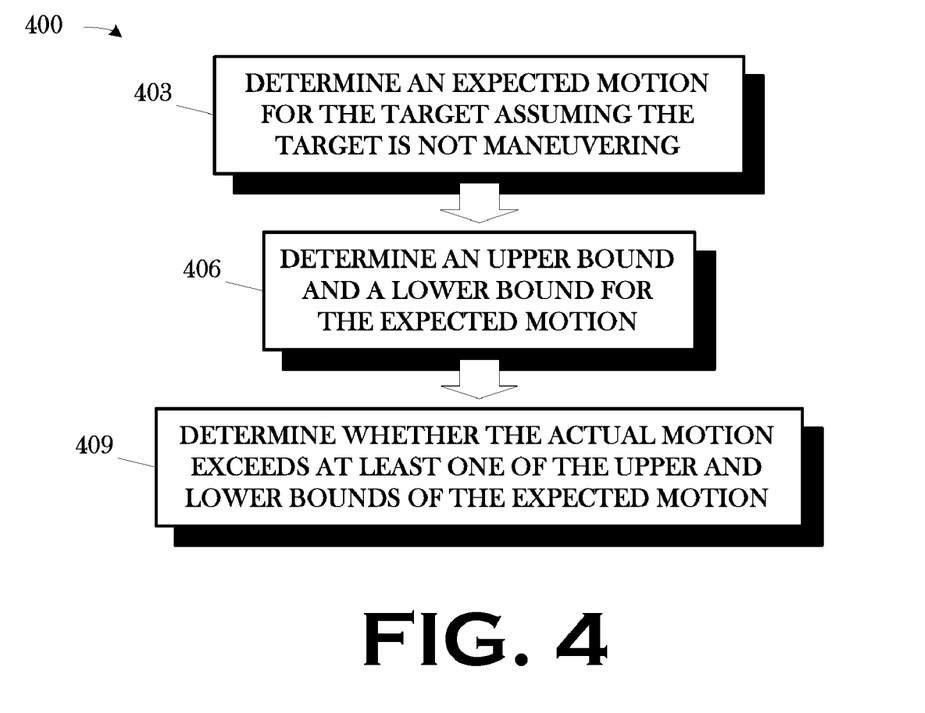
FIG. 4 illustrates a method practiced in accordance with one aspect of the present invention.

Next, the method 400 determines (at 406) an upper bound and a lower bound for the expected motion of the target 103. As those in the art having the benefit of this disclosure will appreciate, there are uncertainties in the measurement of the motion of the target 103. The upper and lower bounds are a recognition, and a quantification, of those uncertainties. That is, the upper and lower bounds represent the +/− margin of error in the expected motion arising from the application of the target measurement filter from which the expected motion is determined. As will be discussed further below, the upper and lower bounds are determined from the noise characteristics of the target measurement filter being applied in the embodiments disclosed herein.

The method 400 then determines (at 409) whether the actual motion of the target 103 sensed at the point 112a exceeds at least one of the upper bound and the lower bound of the expected motion. If the actual motion exceeds the upper or lower bound, or both the upper and lower bound, of the expected motion, then the target 103 has initiated a maneuver and the platform 100 can respond accordingly. As is shown in FIG. 1, the target 103 has not initiated a maneuver at the point 112a. The flight path 124 of the platform 100 therefore remains on the heading 127.

The process of sensing the actual motion of the target 103 is repeated as the platform 100 and the target 103 proceed along their respective flight paths 124, 109. At the point 112b, the target 103 initiates a maneuver that alters the flight path 109 to bring the target 103 to the point 112c. The maneuver may be initiated to evade the platform 100, or as a part of the target 103's own targeting process, or even just a navigational change. The purpose for the maneuver is not material to the present invention.

The platform 100, through the application of the present invention as described herein, detects the maneuver. More particular, at the point 121b of its flight path, the platform 100 detects that the target 103's actual movement has exceeded one of the upper or lower bounds of its expected motion. The platform 100 then begins issuing commands through the GNC 330 to the flight control mechanism 209 to initiate a counter-maneuver to change flight path 124 to bring the platform 100 back to an intercept heading 130 at the point 121c.

More particularly, and now referring now to both FIG. 2 and FIG. 3, the GNC component 330 issues 2C commands to the actuators 224. The flight control surfaces 221 rotate on pins (not shown) relative to the fuselage (also not shown) of the platform 100 to control the flight path of the platform 100 in pitch, yaw, and roll. Thus, in the illustrated embodiment, the 2C commands to the actuators are commands to rotate the flight control surfaces 221 and affect the desired changes in the flight path 124. However, the nature of the commands will vary with the implementation of the flight control mechanism 209. For instance, if the flight control mechanism 209 is implemented in thrusters, the commands might trigger the firing of the thrusters in a pattern and for a duration sufficient to effect the desired counter-maneuver. These and other implementation specific variations in this aspect of the invention will be readily apparent and implementable to those ordinarily skilled in the art having the benefit of this disclosure.

The platform 100, as is mentioned above, is an airborne platform—and, in particular, is a missile. The platform 100 also controls itself in response to the detection of a maneuver. However, the invention is not so limited. In FIG. 1, for example, the aircraft 106 could function as the platform and transmit navigational commands to the missile over a wireless link. Or, the platform could be a ground-based launcher or a naval vessel from which the missile is deployed, with navigational commands again being transmitted to the missile.

Figure 5A:
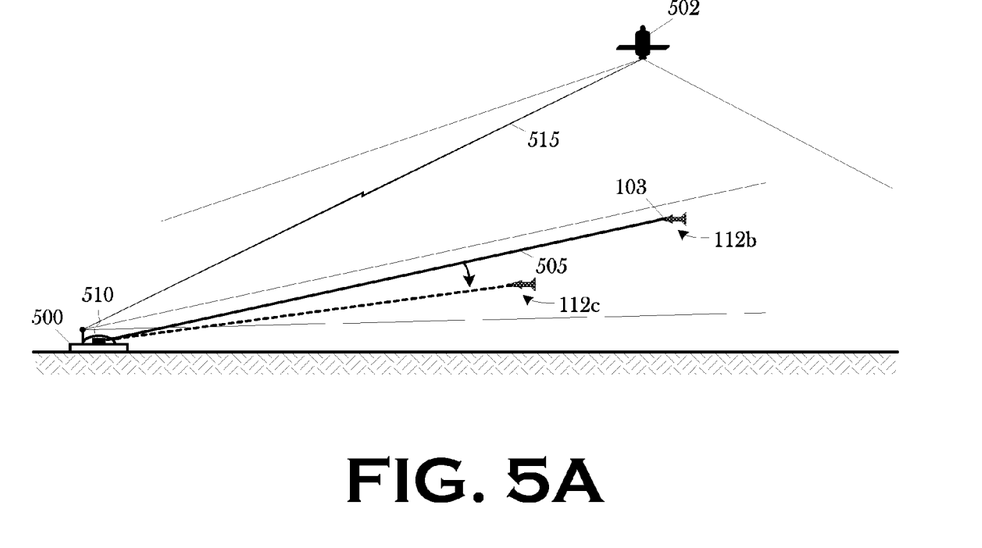
FIG. 5A-FIG. 5B illustrate alternative embodiments of the present invention that are also alternative to that illustrated in FIG. 1.
Figure 5B:
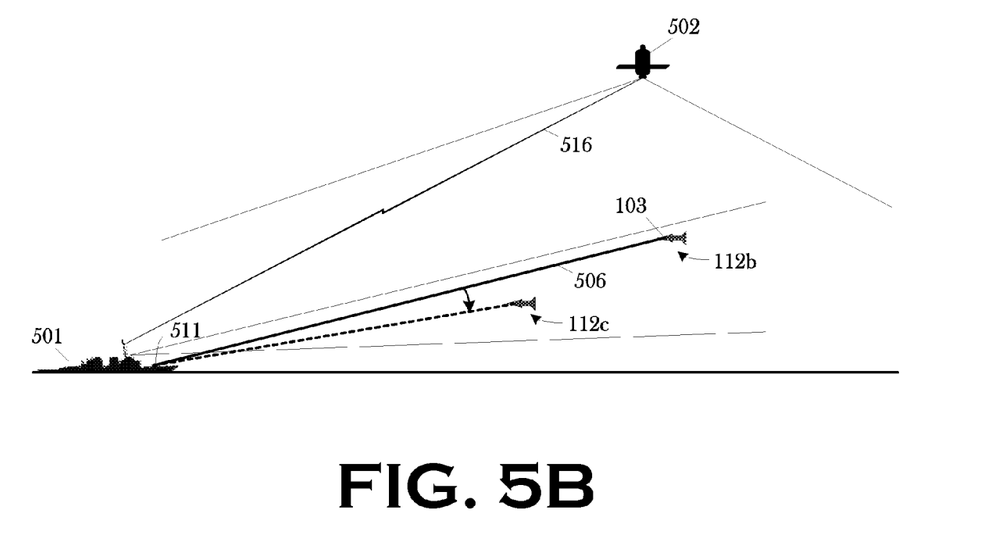

The invention also is not limited to missile-based systems. For example, FIG. 5A-FIG. 5B illustrate embodiments in which the platform may be the ground station 500, the naval vessel 501, or the space satellite 502. In FIG. 5A-FIG. 5B, both the ground station 500 and the naval vessel 501 are fitted with a directed energy ("DE") weapon, e.g., a high intensity laser. DE weapons typically destroy a target by maintaining a focused beam of energy on a particular spot on the target.

Each of the platforms 500-502 remotely sense the target 103 as indicated. Each of the platforms 500, 501 is shown engaging the target 103 using a beam 505, 506 emanating from a respective DE weapon 510, 511. The targeting algorithms of the DE weapons 510, 511 interface with the software performing the method of the present invention to detect maneuvers initiated by the target 103 to help maintain the spot of the beams 505, 506 as the target 103 maneuvers from point 112b to point 112c. In FIG. 5A-FIG. 5B, the space satellite 502 is not equipped with a weapon, and so is used to transmit targeting information regarding the maneuver to the ground station 500 and/or the naval vessel 501 over the wireless links 515, 516. However, the space satellite 502 could theoretically also be equipped with a weapon, e.g., a DE weapon, with which to engage the target 103.

Note also that, in some embodiments, the remote sensing and detection functions may be separated. For example, in FIG. 5A-FIG. 5B, the satellite 502 might remotely sense the target 103. The remotely sensed data can then be transmitted to the platforms 500, 501, which then perform the detection.

The invention admits wide variation in the type of weapon system with which it may be used in military contexts. In the scenarios of FIG. 1 and FIG. 5A-FIG. 5B, the method of the invention is shown in use with a missile-based system and DE-based systems. The method of the invention may also be used with, for example, projectile weapons (not shown). The invention is not limited by the nature of the weapon being deployed. Indeed, as is apparent from FIG. 4, the invention may be employed in the absence of weapons.

The invention can therefore be employed in purely civilian contexts. One such application might be collision avoidance. For instance, collisions with space debris can seriously damage satellites, space stations, and other spacecraft. Such debris is meticulously tracked by agencies such as the National Aeronautics and Space Administration ("NASA") of the United States federal government and North American Aerospace Defense ("NORAD") Command jointly operated by the national governments of Canada and the United States. Such an agency or a spacecraft might wish to monitor whether some disturbance has altered the orbital path of space debris in a manner putting it on a collision course with a satellite. If so, commands can be issued either from aboard the spacecraft or from the ground to maneuver the spacecraft to avoid the debris. Other civilian applications will become apparent to those ordinarily skilled in the art having the benefit of this disclosure.

The present invention is similarly flexible with respect to the nature of the target. In the embodiments disclosed above, the target 103 is a missile. The target 103 need not necessarily be airborne and could be, for example, land-based. However, the invention is expected to yield greater benefits with targets of higher speed, which are typically airborne. Although not previously mentioned, the target 103 is ballistic in the sense that it is not under thrust. The invention may nevertheless be extended to targets that are under thrust. The embodiments disclosed herein would, however, need to be modified to incorporate estimations of the thrust of the target. Techniques for estimating the thrust of a target are known to the art and any suitable technique may be employed.

To further an understanding of the present invention, two particular embodiments of the method 400, shown in FIG. 4, will now be presented in greater detail. The methods do not require modifying the target measurement filter but rather work in conjunction with the target measurement filter. The two embodiments use velocity and acceleration measurements from the target measurement filter. They can also be used to set the measurement error requirements on the target measurement filter. This can be done by running the target maneuver detection method with a known maneuvering target trajectory. The maneuver acceleration must be greater than the acceleration due to noise. This sets up the maximum velocity and acceleration measurement error requirements for the filter.

The idea is based on the estimated ballistic coefficient and gravity, both obtained from the target measurement filter. With the ballistic coefficient, one can estimate the acceleration (actually deceleration) due to aerodynamic drag. One can also estimate the acceleration due to gravity. For a non-maneuvering target, target accelerations or flight path angular rates are expected to be due to drag and gravity only. Since the measurements are noisy, there are upper and lower bounds of the expected accelerations or flight path angular rates due to noise.

As mentioned, two embodiments are disclosed herein. One embodiment resolves the acceleration along the velocity frame. The two acceleration components perpendicular to the velocity vector are used to check for the expected acceleration due to aerodynamic drag and gravity plus the uncertainties associated with the filter measurements. The expected upper and lower bound accelerations due to filter measurement errors are computed. If the measured accelerations fall within the expected upper and lower acceleration bounds, no maneuvering occurs. Otherwise, maneuvering occurs.

The second embodiment uses flight path angular rates. The expected flight path angular rates due to gravity only are computed. The uncertainties associated with the filter measurements are added to and subtracted from the expected flight path angular rates to estimate the upper and lower rate bounds. The flight path angular rates computed directly from the filter measurements are used to check to see if they fall within the expected upper and lower rate bounds. If the actual flight path angular rates are within the expected upper and lower bound values of flight path angular rates, then no maneuvering occurs. Otherwise, maneuvering occurs.

For both methods, estimating the realistic upper and lower bounds of the accelerations or flight path angular rates is a significant aspect. A simple but time-consuming approach evaluates the acceleration and flight path rates by all possible combinations of errors to determine the upper and lower bound values. A more efficient approach estimates the bounds by examining the gradient of acceleration in the velocity frame and the gradient of the flight path angular rates with respect to the velocity and acceleration in the North-East-Down ("NED") frame. This latter approach will be explained in detail later.

The following discussion will begin with the formulation of the flight path angles, the coordinate system used, and the corresponding transformation matrices. Transformation matrices based on angles and based on the velocity components directly are derived. In the following section, flight path angle errors due to velocity measurement errors are derived. Expected upper and lower angle bounds are derived to account for the velocity measurement errors. The next section will express the acceleration in the velocity frame and derive the expected acceleration bounds due to velocity and acceleration measurement errors. The following section will formulate the flight path angular rates and the upper and lower bounds of the rates due to velocity and acceleration measurement errors. Finally, the two target maneuver detection methods are discussed in the closing section.

Figure 6:
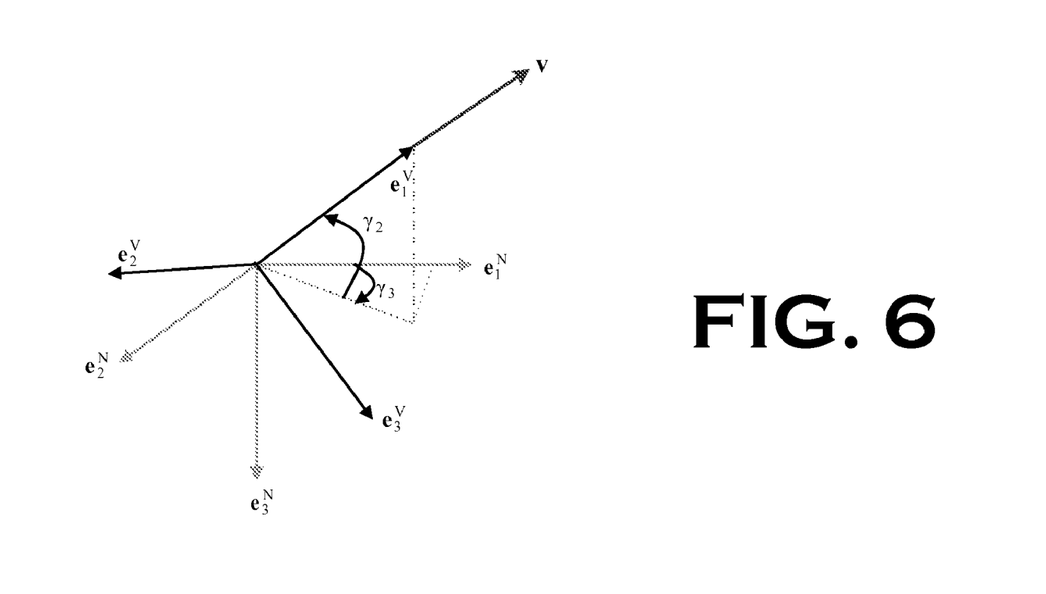
FIG. 6 illustrates the coordinate systems used in the alternative embodiments of FIG. 4 disclosed herein.

This section will discuss the formulation of the flight path angles, the coordinate system used, and the corresponding transformation matrices. In this section, the flight path angles and the coordinate system that aligns with the velocity vector will be defined. Let the reference coordinate system be NED frame and $[e_1^N, e_2^N, e_3^N]$ be the basis vectors associated with the frame. The target velocity (V) frame basis vectors $[e_1^V,$ $e_2^V, e_3^V$] are chosen such that $e_1^V$ is aligned with the target velocity (see FIG. 6). Let $\gamma_2$ be the flight path elevation angle and $\gamma_3$ be the flight path azimuth angle as shown in FIG. 6. The flight path angles are defined as $$\gamma_2 = \tan^{-1}\left(\frac{-V_3^N}{\sqrt{(V_1^N)^2 + (V_2^N)^2}}\right), \gamma_3 = \tan^{-1}\left(\frac{V_2^N}{V_1^N}\right). \quad (1)$$

We will derive the transformation matrices associated with the NED frame and V frame. The transformation matrices expressed explicitly in terms of flight path angles and the transformation matrices expressed explicitly in terms of velocity components will also be derived.

The NED and V frame basis vectors are related by the following transformations:

$$\begin{bmatrix} e_1^V \\ e_2^V \\ e_3^V \end{bmatrix} = \begin{bmatrix} \cos\gamma_2 & 0 & -\sin\gamma_2 \\ 0 & 1 & 0 \\ \sin\gamma_2 & 0 & \cos\gamma_2 \end{bmatrix} \begin{bmatrix} \cos\gamma_3 & \sin\gamma_3 & 0 \\ -\sin\gamma_3 & \cos\gamma_3 & 0 \\ 0 & 0 & 1 \end{bmatrix} \begin{bmatrix} e_1^N \\ e_2^N \\ e_3^N \end{bmatrix} \quad (2)$$

$$= \begin{bmatrix} \cos\gamma_2\cos\gamma_3 & \cos\gamma_2\sin\gamma_3 & -\sin\gamma_2 \\ -\sin\gamma_3 & \cos\gamma_3 & 0 \\ \sin\gamma_2\cos\gamma_3 & \sin\gamma_2\sin\gamma_3 & \cos\gamma_2 \end{bmatrix} \begin{bmatrix} e_1^N \\ e_2^N \\ e_3^N \end{bmatrix},$$

$$\begin{bmatrix} e_1^N \\ e_2^N \\ e_3^N \end{bmatrix} \begin{bmatrix} \cos\gamma_2\cos\gamma_3 & -\sin\gamma_3 & \sin\gamma_2\cos\gamma_3 \\ \cos\gamma_2\sin\gamma_3 & \cos\gamma_3 & \sin\gamma_2\sin\gamma_3 \\ -\sin\gamma_2 & 0 & \cos\gamma_2 \end{bmatrix} \begin{bmatrix} e_1^V \\ e_2^V \\ e_3^V \end{bmatrix}. \quad (3)$$

It follows from Eq. (1) that $$\cos\gamma_2 = \frac{\sqrt{(v_1^N)^2 + (v_2^N)^2}}{\sqrt{(v_1^N)^2 + (v_2^N)^2 + (v_3^N)^2}}, \quad (4)$$

$$\sin\gamma_2 = \frac{-v_3^N}{\sqrt{(v_1^N)^2 + (v_2^N)^2 + (v_3^N)^2}},$$

$$\cos\gamma_3 = \frac{v_1^N}{\sqrt{(v_1^N)^2 + (v_2^N)^2}}, \quad (5)$$

$$\sin\gamma_3 = \frac{v_2^N}{\sqrt{(v_1^N)^2 + (v_2^N)^2}}.$$

Let $$u = \sqrt{(v_1^N)^2 + (v_2^N)^2}, \quad (6)$$

$$v = \sqrt{(v_1^N)^2 + (v_2^N)^2 + (v_3^N)^2}.$$

We can simplify Eq. (4) and Eq. (5) as $$\cos\gamma_2 = \frac{u}{v}, \sin\gamma_2 = \frac{-v_3^N}{v}, \quad (7)$$

$$\cos\gamma_3 = \frac{v_1^N}{u}, \sin\gamma_3 = \frac{v_2^N}{u}. \quad (8)$$

Instead of the typical sine and cosine matrices expressed in Eq. (2) and Eq. (3), it will be more convenient to express the transformation matrices in terms of the velocity components directly for later error analysis. Using Eq. (7) and Eq. (8), one can rewrite Eq. (2) and Eq. (3) explicitly in terms of the velocity components as $$\begin{bmatrix} e_1^V \\ e_2^V \\ e_3^V \end{bmatrix} = \begin{bmatrix} \frac{v_1^N}{v} & \frac{v_2^N}{v} & \frac{v_3^N}{v} \\ -\frac{v_2^N}{u} & \frac{v_1^N}{u} & 0 \\ -\frac{v_1^N v_3^N}{uv} & -\frac{v_2^N v_3^N}{uv} & \frac{u}{v} \end{bmatrix} \begin{bmatrix} e_1^N \\ e_2^N \\ e_3^N \end{bmatrix}, \quad (9)$$

$$\begin{bmatrix} e_1^N \\ e_2^N \\ e_3^N \end{bmatrix}, = \begin{bmatrix} \frac{v_1^N}{v} & -\frac{v_2^N}{u} & -\frac{v_1^N v_3^N}{uv} \\ \frac{v_2^N}{v} & \frac{v_1^N}{u} & -\frac{v_2^N v_3^N}{uv} \\ \frac{v_3^N}{v} & 0 & \frac{u}{v} \end{bmatrix} \begin{bmatrix} e_1^V \\ e_2^V \\ e_3^V \end{bmatrix}. \quad (10)$$

As seen in the previous section, the flight path angles are functions of the velocity components in NED frame. The velocity measurements have errors. This section will discuss these errors and their consequences. More particularly, flight path angle errors due to velocity measurement errors are derived and expected upper and lower angle bounds are derived to account for the velocity measurement errors.

If the target velocity $v^N$ has an error and the expected error is $\Delta v^N$, the expected upper and lower bound values of $\gamma_2$ and $\gamma_3$ due to the velocity error can be found by examining the changes of $\gamma_2$ and $\gamma_3$ due to $\Delta v^N$. Let the flight path angles for $v^N$ and $v^N + \Delta v^N$, respectively, be $$\gamma_2(v^N) = \tan^{-1}\left(\frac{-(v_3^N)}{\sqrt{(v_1^N)^2 + (v_2^N)^2}}\right), \quad (11)$$

$$\gamma_3(v^N) = \tan^{-1}\left(\frac{v_2^N}{v_1^N}\right),$$

$$\gamma_2(v^N + \Delta v^N) = \tan^{-1}\left(\frac{-(v_3^N + \Delta v_3^N)}{\sqrt{(v_1^N + \Delta v_1^N)^2 + (v_2^N + \Delta v_2^N)^2}}\right), \quad (12)$$

$$\gamma_3(v^N + \Delta v^N) = \tan^{-1}\left(\frac{v_2^N + \Delta v_2^N}{v_1^N + \Delta v_1^N}\right).$$

One approach to estimating the upper and lower bounds of the flight path angles is to compute all possible values of $\gamma_2$ and $\gamma_3$ with all possible combinations of $\pm\Delta v_i^F$ ($i=1,2,3$) and $v_i^F$ ($i=1,2,3$), and pick the maximum and minimum. Obviously this is a time-consuming task. Another approach is to use Taylor series approximation. If one lets $$F_{ij} = \frac{\partial \gamma_i}{\partial v_j^N} \quad (13)$$

$(i = 2, 3; j = 1, 2, 3),$ $$\overline{F}_{ij} = \begin{cases} -1 & \text{if } F_{ij} < 0 \\ 0 & \text{if } F_{ij} = 0 \\ 1 & \text{if } F_{ij} > 0 \end{cases} \quad (14)$$

$(i = 2, 3; j = 1, 2, 3),$ then one can approximate Eq. (12) by Taylor series first order approximation as $$\gamma_2(v^N + \Delta v^N) \approx \gamma_2(v^N) + \frac{\partial \gamma_2}{\partial v_1^N}\Delta v_1^N + \frac{\partial \gamma_2}{\partial v_2^N}\Delta v_2^N + \frac{\partial \gamma_2}{\partial v_3^N}\Delta v_3^N \quad (15)$$
$$= \gamma_2(v^N) + F_{21}\Delta v_1^N + F_{22}\Delta v_2^N + F_{23}\Delta v_3^N$$

$$\gamma_3(v^N + \Delta v^N) \approx \gamma_3(v^N) + \frac{\partial \gamma_3}{\partial v_1^N}\Delta v_1^N + \frac{\partial \gamma_3}{\partial v_2^N}\Delta v_2^N \quad (16)$$
$$= \gamma_3(v^N) + F_{31}\Delta v_1^N + F_{32}\Delta v_2^N + F_{33}\Delta v_3^N.$$

The changes in flight path angles due to the velocity changes can be obtained by rearranging Eq. (15) and Eq. (16) as $$\Delta\gamma_2 = \gamma_2(v^N + \Delta v^N) - \gamma_2(v^N) = F_{21}\Delta v_1^N + F_{22}\Delta v_2^N + F_{23}\Delta v_3^N, \quad (17)$$

$$\Delta\gamma_3 = \gamma_3(v^N + \Delta v^N) - \gamma_3(v^N) = F_{31}\Delta v_1^N + F_{32}\Delta v_2^N + F_{33}\Delta v_3^N. \quad (18)$$

For the upper bound of $\gamma_2$, one expects $\Delta\gamma_2$ to be positive. In order to ensure that $\Delta\gamma_2$ is positive, restrict each term that contributes to $\Delta\gamma_2$ to be positive (or at least non-negative). If $F_{2j}$ is positive, choose a positive value of $\Delta v_j^N$. If $F_{2j}$ is negative, choose a negative value of $\Delta v_j^N$ so that $F_{2j}\Delta v_j^N$ is positive. On the other hand, for the lower bound of $\gamma_2$, one expects $\Delta\gamma_2$ to be negative. In order to ensure that $\Delta\gamma_2$ is negative, each term that contributes to $\Delta\gamma_2$ is expected to be negative (or at least non-positive). In this case, if $F_{2j}$ is positive, choose a negative value of $\Delta v_j^N$. If $F_{2j}$ is negative, choose a positive value of $\Delta v_j^N$ so that $F_{2j}\Delta v_j^N$ is negative.

The partial derivatives of $\gamma_2$ and $\gamma_3$ with respect to $v_1^N$, $v_2^N$, and $v_3^N$ are $$F_{21} = \frac{v_1^N v_3^N \cos^2\gamma_2}{u^3} = \frac{v_1^N v_3^N}{uv^2}, \quad (19)$$
$$F_{22} = \frac{v_2^N v_3^N \cos^2\gamma_2}{u^3} = \frac{v_2^N v_3^N}{uv^2},$$
$$F_{23} = -\frac{\cos^2\gamma_2}{u} = -\frac{u}{v^2},$$

$$F_{31} = -\frac{v_2^N \cos^2\gamma_3}{(v_1^N)^2} = -\frac{v_2^N}{u^2}, \quad (20)$$
$$F_{32} = \frac{\cos^2\gamma_3}{v_1^N} = \frac{v_1^N}{u^2}, \quad F_{33} = 0.$$

For convenience, define $$\hat{U}_{ij} = v_j^N + \bar{F}_{ij}\Delta v_j^N \ (i=2,3; j=1,2,3), \quad \check{U}_{ij} = v_j^N - \bar{F}_{ij}\Delta v_j^N$$
$$(i=2,3; j=1,2,3), \quad (21)$$

where $\hat{U}_{ij}$ is the target velocity component j in NED frame that will contribute to the upper bound of the flight path angle $\gamma_i$, and $\check{U}_{ij}$ is the target velocity component j in NED frame that will contribute to the lower bound of the flight path angle $\gamma_i$.

Let the upper bounds of the flight path angles be $\hat{\gamma}_2$ and $\hat{\gamma}_3$ and the lower bounds of the flight path angles be $\check{\gamma}_2$ and $\check{\gamma}_3$. Their values can then be estimated by the following equations:

$$\hat{\gamma}_2 = \tan^{-1}\left(\frac{-\hat{U}_{23}}{\sqrt{(\hat{U}_{21})^2 + (\hat{U}_{22})^2}}\right), \quad (22)$$

$$\check{\gamma}_2 = \tan^{-1}\left(\frac{-\check{U}_{23}}{\sqrt{(\check{U}_{21})^2 + (\check{U}_{22})^2}}\right),$$

$$\hat{\gamma}_3 = \tan^{-1}\left(\frac{\hat{U}_{32}}{\hat{U}_{31}}\right), \quad (23)$$

$$\check{\gamma}_3 = \tan^{-1}\left(\frac{\check{U}_{32}}{\check{U}_{31}}\right).$$

This section will express the acceleration in the velocity frame and derive the expected acceleration bounds due to velocity and acceleration measurement errors. The acceleration in NED frame is expressed in the V frame by using a transformation matrix which is a function of velocity. If the velocity has an error, this will contribute acceleration components uncertainties in the velocity frame. Furthermore, the acceleration measurement in the NED frame itself has an error. In this section, the acceleration components will be expressed in the V frame and the upper and lower bounds of the acceleration will be expressed in V frame due to the velocity and acceleration measurement errors in the NED frame.

Recalling Eq. (9), the acceleration in NED frame can be expressed in the V frame as $$\begin{bmatrix} a_1^V \\ a_2^V \\ a_3^V \end{bmatrix} = \begin{bmatrix} \frac{v_1^N}{v} & \frac{v_2^N}{v} & \frac{v_3^N}{v} \\ -\frac{v_2^N}{u} & \frac{v_1^N}{u} & 0 \\ -\frac{v_1^N v_3^N}{uv} & -\frac{v_2^N v_3^N}{uv} & \frac{u}{v} \end{bmatrix} \begin{bmatrix} a_1^N \\ a_2^N \\ a_3^N \end{bmatrix}. \quad (24)$$

Expanding Eq. (24):

$$a_1^V = \frac{v_1^N a_1^N + v_2^N a_2^N + v_3^N a_3^N}{v}, \quad (25)$$

$$a_2^V = \frac{v_1^N a_2^N - v_2^N a_1^N}{u}, \quad (26)$$

$$a_3^V = \frac{u^2 a_3^N - v_3^N(v_1^N a_1^N + v_2^N a_2^N)}{uv}. \quad (27)$$

Let $$G_{ij} = \frac{\partial a_i^V}{\partial v_j^N} \quad (28)$$
$$(i = 1, 2, 3; j = 1, 2, 3),$$

$$H_{ij} = \frac{\partial a_i^V}{\partial a_j^N}$$
$$(i = 1, 2, 3; j = 1, 2, 3),$$

$$\overline{G}_{ij} = \begin{cases} -1 & \text{if } G_{ij} < 0 \\ 0 & \text{if } G_{ij} = 0 \\ 1 & \text{if } G_{ij} > 0 \end{cases} \quad (i = 1, 2, 3; j = 1, 2, 3), \tag{29}$$

$$\overline{H}_{ij} = \begin{cases} -1 & \text{if } H_{ij} < 0 \\ 0 & \text{if } H_{ij} = 0 \\ 1 & \text{if } H_{ij} > 0 \end{cases} \quad (i = 1, 2, 3; j = 1, 2, 3).$$

We now differentiate $a_i^V$ with respect to $v_j^N$ and $a_j^N$ from Eq. (25), Eq. (26), and Eq. (27). The results are $$G_{11} = \frac{a_1^N}{v} - \frac{v_1^N a_1^V}{v^2} = \frac{va_1^N - v_1^N a_1^V}{v^2}, \tag{30}$$

$$G_{12} = \frac{va_2^N - v_2^N a_1^V}{v^2}, \quad G_{13} = \frac{va_3^N - v_3^N a_1^V}{v^2},$$

$$G_{21} = \frac{ua_2^N - v_1^N a_2^V}{u^2}, \tag{31}$$

$$G_{22} = -\frac{ua_1^N + v_2^N a_2^V}{u^2}, \quad G_{23} = 0,$$

$$G_{31} = \frac{2v_1^N a_3^N - v_3^N a_1^N}{uv} - \frac{v_1^N a_3^V}{v^2} - \frac{v_1^N a_3^V}{u^2} \tag{32}$$

$$= \frac{uv(2v_1^N a_3^N - v_3^N a_1^N) - (u^2 + v^2)v_1^N a_3^V}{u^2 v^2},$$

$$G_{32} = \frac{2v_2^N a_3^N - v_3^N a_2^N}{uv} - \frac{v_2^N a_3^V}{v^2} - \frac{v_2^N a_3^V}{u^2} \tag{33}$$

$$= \frac{uv(2v_2^N a_3^N - v_3^N a_2^N) - (u^2 + v^2)v_2^N a_3^V}{u^2 v^2},$$

$$G_{33} = -\frac{v_1^N a_1^N + v_2^N a_2^N}{uv} - \frac{v_3^N a_3^V}{v^2} = -\frac{v(v_1^N a_1^N + v_2^N a_2^N) + uv_3^N a_3^V}{v^2 u}, \tag{34}$$

$$H_{11} = \frac{v_1^N}{v}, \quad H_{12} = \frac{v_2^N}{v}, \quad H_{13} = \frac{v_3^N}{v}, \tag{35}$$

$$H_{21} = -\frac{v_2^N}{u}, \quad H_{22} = \frac{v_1^N}{u}, \quad H_{23} = 0, \tag{36}$$

$$H_{31} = -\frac{v_1^N v_3^N}{uv}, \quad H_{32} = -\frac{v_2^N v_3^N}{uv}, \quad H_{33} = \frac{u}{v}. \tag{37}$$

Define $$\hat{V}_{ij} = v_j^N + \overline{G}_{ij} \Delta v_j^N \quad (i = 1, 2, 3; j = 1, 2, 3), \tag{38}$$

$$\check{V}_{ij} = v_j^N + \overline{G}_{ij} \Delta v_j^N \quad (i = 1, 2, 3; j = 1, 2, 3),$$

$$\hat{A}_{ij} = a_j^N + \overline{H}_{ij} \Delta a_j^N \quad (i = 1, 2, 3; j = 1, 2, 3), \tag{39}$$

$$\check{A}_{ij} = a_j^N + \overline{H}_{ij} \Delta a_j^N \quad (i = 1, 2, 3; j = 1, 2, 3).$$

Let $\hat{a}_1^V$, $\hat{a}_2^V$, and $\hat{a}_3^V$ be the upper bounds of the acceleration components in the V frame and $\check{a}_1^V$, $\check{a}_2^V$, and $\check{a}_3^V$ be the lower bounds of the acceleration components in the V frame. Using arguments similar to those used in a previous section, the upper and lower acceleration bounds can be expressed in V frame as $$\hat{a}_1^V = \frac{\hat{V}_{11}\hat{A}_{11} + \hat{V}_{12}\hat{A}_{12} + \hat{V}_{13}\hat{A}_{13}}{\sqrt{(\hat{V}_{11})^2 + (\hat{V}_{12})^2 + (\hat{V}_{13})^2}}, \tag{40}$$

$$\check{a}_1^V = \frac{\check{V}_{11}\check{A}_{11} + \check{V}_{12}\check{A}_{12} + \check{V}_{13}\check{A}_{13}}{\sqrt{(\check{V}_{11})^2 + (\check{V}_{12})^2 + (\check{V}_{13})^2}},$$

$$\hat{a}_2^V = \frac{\hat{V}_{21}\hat{A}_{22} - \hat{V}_{22}\hat{A}_{21}}{\sqrt{(\hat{V}_{21})^2 + (\hat{V}_{22})^2}}, \tag{41}$$

$$\check{a}_2^V = \frac{\check{V}_{21}\check{A}_{22} - \check{V}_{22}\check{A}_{21}}{\sqrt{(\check{V}_{21})^2 + (\check{V}_{22})^2}},$$

$$\hat{a}_3^V = \frac{\hat{A}_{33} - \hat{V}_{33}(\hat{V}_{31}\hat{A}_{31} + \hat{V}_{32}\hat{A}_{32})\left[(\hat{V}_{31})^2 + (\hat{V}_{32})^2\right]}{\sqrt{(\hat{V}_{31})^2 + (\hat{V}_{32})^2}\sqrt{(\hat{V}_{31})^2 + (\hat{V}_{32})^2 + (\hat{V}_{33})^2}}, \tag{42}$$

$$\check{a}_3^V = \frac{\check{A}_{33} - \check{V}_{33}(\check{V}_{31}\check{A}_{31} + \check{V}_{32}\check{A}_{32})\left[(\check{V}_{31})^2 + (\check{V}_{32})^2\right]}{\sqrt{(\check{V}_{31})^2 + (\check{V}_{32})^2}\sqrt{(\check{V}_{31})^2 + (\check{V}_{32})^2 + (\check{V}_{33})^2}}.$$

A less efficient method to compute the upper and lower bounds of the acceleration is to find the maximum and minimum values for all combinations of errors, as shown in the following equations:

$$\hat{a}_1^V = \text{Max}\left\{\frac{(v_1^N \pm \Delta v_1^N)(a_1^N \pm \Delta a_1^N) + (v_2^N \pm \Delta v_2^N)(a_2^N \pm \Delta a_2^N) + (v_3^N \pm \Delta v_3^N)(a_3^N \pm \Delta a_3^N)}{\sqrt{(v_1^N \pm \Delta v_1^N)^2 + (v_2^N \pm \Delta v_2^N)^2 + (v_3^N \pm \Delta v_3^N)^2}}\right\}, \tag{43}$$

$$\hat{a}_2^V = \text{Max}\left\{\frac{(v_1^N \pm \Delta v_1^N)(a_2^N \pm \Delta a_2^N) - (v_2^N \pm \Delta v_2^N)(a_1^N \pm \Delta a_1^N)}{\sqrt{(v_1^N \pm \Delta v_1^N)^2 + (v_2^N \pm \Delta v_2^N)^2}}\right\}, \tag{44}$$

-continued $$\tilde{a}_3^V = \text{Max}\left[\frac{\{(v_1^N \pm \Delta v_1^N)^2 + (v_2^N \pm \Delta v_2^N)^2\}(a_3^N \pm \Delta a_3^N) - (v_3^N \pm \Delta v_3^N)\{(v_1^N \pm \Delta v_1^N)(a_1^N \pm \Delta a_1^N) + (v_2^N \pm \Delta v_2^N)(a_2^N \pm \Delta a_2^N)\}}{\sqrt{(v_1^N \pm \Delta v_1^N)^2 + (v_2^N \pm \Delta v_2^N)^2}\sqrt{(v_1^N \pm \Delta v_1^N)^2 + (v_2^N \pm \Delta v_2^N)^2 + (v_3^N \pm \Delta v_3^N)^2}}\right], \quad (45)$$

$$\check{a}_1^V = \text{Min}\left\{\frac{(v_1^N \pm \Delta v_1^N)(a_1^N \pm \Delta a_1^N) + (v_2^N \pm v_2^N)(a_2^N \pm \Delta a_2^N) + (v_3^N \pm \Delta v_3^N)(a_3^N \pm \Delta a_3^N)}{\sqrt{(v_1^N \pm \Delta v_1^N)^2 + (v_2^N \pm \Delta v_2^N)^2 + (v_3^N \pm \Delta v_3^N)^2}}\right\}, \quad (46)$$

$$\check{a}_2^V = \text{Min}\left\{\frac{(v_1^N \pm v_1^N)(a_2^N \pm \Delta a_2^N) - (v_2^N \pm v_2^N)(a_1^N \pm \Delta a_1^N)}{\sqrt{(v_1^N \pm \Delta v_1^N)^2 + (v_2^N \pm \Delta v_2^N)^2}}\right\}, \quad (47)$$

$$\check{a}_3^V = \text{Min} \quad (48)$$

$$\left\{\frac{\{(v_1^N \pm \Delta v_1^N)^2 + (v_2^N \pm \Delta v_2^N)^2\}(a_3^N \pm \Delta a_3^N) - (v_3^N \pm \Delta v_3^N)\{(v_1^N \pm \Delta v_1^N)^2(a_1^N \pm \Delta a_1^N) + (v_2^N \pm \Delta v_2^N)(a_2^N \pm a_2^N)\}}{\left(\sqrt{(v_1^N \pm \Delta v_1^N)^2 + (v_2^N \pm \Delta v_2^N)^2}\sqrt{(v_1^N \pm \Delta v_1^N)^2 + (v_2^N \pm \Delta v_2^N)^2 + (v_3^N \pm \Delta v_3^N)^2}\right)}\right\}.$$

This section will formulate the flight path angular rates and the upper and lower bounds of the rates due to velocity and acceleration measurement errors. The flight path angular rates will first be derived. The flight path angular rates are a function of the velocity and acceleration components in the NED frame. The velocity and acceleration measurements have errors, so there are uncertainties to the flight path angular rates due to the measurement errors. The upper and lower bounds of the flight path angular rates due to the measurement errors will be derived.

The flight path elevation rate is obtained by differentiating Eq. (1). The result is $$\dot{\gamma}_2 = \cos^2\gamma_2\left\{\frac{-a_3^N}{\sqrt{(v_1^N)^2 + (v_2^N)^2}} + \frac{v_3^N(v_1^N a_1^N + v_2^N a_2^N)}{\{(v_1^N)^2 + (v_2^N)^2\}^{3/2}}\right\}. \quad (49)$$

With the help of Eq. (6), Eq. (7), and Eq. (27), one can express Eq. (49) as $$\dot{\gamma}_2 = \left\{\frac{v_3^N(v_1^N a_1^N + v_2^N a_2^N) - u^2 a_3^N}{uv^2}\right\} = -\frac{a_3^V}{v}. \quad (50)$$

Similarly, the flight path azimuth angular rate is obtained by differentiating Eq. (1). In this case, one has $$\dot{\gamma}_3 = \cos^2\gamma_3\left\{\frac{a_2^N}{v_1^N} - \frac{v_2^N a_1^N}{(v_1^N)^2}\right\}. \quad (51)$$

With the help of Eq. (8) and Eq. (26), one can simplify Eq. (51) as $$\dot{\gamma}_3 = \frac{v_1^N a_2^N - v_2^N a_1^N}{u^2} = \frac{a_2^V}{u}. \quad (52)$$

On the other hand, if the flight path angular rates are given, the acceleration in the V frame can be calculated from Eq. (50) and Eq. (52). The results are $$a_2^V = u\dot{\gamma}_3,\ a_3^V = -v\dot{\gamma}_2. \quad (53)$$

Let $$M_{ij} = \frac{\partial \dot{\gamma}_i}{\partial v_j^N}\ (i = 2, 3;\ j = 1, 2, 3),\ N_{ij} = \frac{\partial \dot{\gamma}_i}{\partial a_j^V}\ (i = 2, 3;\ j = 1, 2, 3), \quad (54)$$

$$\overline{M}_{ij} = \begin{cases} -1 & \text{if } M_{ij} < 0 \\ 0 & \text{if } M_{ij} = 0\ (i = 2, 3;\ j = 1, 2, 3), \\ 1 & \text{if } M_{ij} > 0 \end{cases} \quad (55)$$

$$\overline{N}_{ij} = \begin{cases} -1 & \text{if } N_{ij} < 0 \\ 0 & \text{if } N_{ij} = 0\ (i = 2, 3;\ j = 1, 2, 3). \\ 1 & \text{if } N_{ij} > 0 \end{cases}$$

Differentiating Eq. (50) and Eq. (52) with respect to $v_j^N$ and $a_j^V$:

$$M_{21} = \frac{a_3^V v_1^N}{v^3} - \frac{\partial a_3^V}{v \partial v_1^N} = \quad (56)$$
$$\frac{a_3^V v_1^N}{v^3} - \frac{G_{31}}{v} = \frac{a_3^V v_1^N}{v^3} - \frac{uv(2v_1^N a_3^N - v_3^N a_1^N) - (u^2 + v^2)v_1^N a_3^V}{u^2 v^3},$$

$$M_{22} = \frac{a_3^V v_2^N}{v^3} - \frac{\partial a_3^V}{v \partial v_2^N} = \quad (57)$$
$$\frac{a_3^V v_2^N}{v^3} - \frac{G_{32}}{v} = \frac{a_3^V v_2^N}{v^3} - \frac{uv(2v_2^N a_3^N - v_3^N a_2^N) - (u^2 + v^2)v_2^N a_3^V}{u^2 v^3},$$

$$M_{23} = \frac{a_3^V v_3^N}{v^3} - \frac{\partial a_3^V}{v \partial v_3^N} = \quad (58)$$
$$\frac{a_3^V v_3^N}{v^3} - \frac{G_{33}}{v} = \frac{a_3^V v_3^N}{v^3} + \frac{v(v_1^N a_1^N + v_2^N a_2^N) + uv_3^N a_3^V}{v^3 u},$$

$$M_{31} = \frac{a_2^V v_1^N}{u^3} + \frac{\partial a_2^V}{u \partial v_1^N} = -\frac{a_2^V v_1^N}{u^3} + \frac{G_{21}}{u} = -\frac{a_2^V v_1^N}{u^3} + \frac{ua_2^N - v_1^N a_2^V}{u^3}, \quad (59)$$

-continued $$M_{32} = \frac{a_2^V v_2^N}{u^3} + \frac{\partial a_2^V}{u \partial v_2^N} = -\frac{a_2^V v_1^N}{u^3} + \frac{G_{22}}{u} = -\frac{a_2^V v_2^N}{u^3} - \frac{u a_1^N + v_2^N a_2^V}{u^3}, \quad (60)$$

$$M_{33} = \frac{\partial a_2^V}{u \partial v_3^N} = \frac{G_{23}}{u} = 0, \quad (61)$$

$$N_{21} = 0, N_{22} = 0, N_{23} = -\frac{1}{v}, \quad (62)$$

$$N_{31} = 0, N_{32} = \frac{1}{u}, N_{33} = 0. \quad (63)$$

We define $$\hat{V}_{ij} = v_j^N + \overline{M}_{ij} \Delta v_j^N, \check{V}_{ij} = v_j^N - \overline{M}_{ij} \Delta v_j^N, \quad (64)$$

$$\hat{A}_{ij} = a_j^V + \overline{N}_{ij} \Delta a_j^V, \check{A}_{ij} = a_j^V - \overline{N}_{ij} \Delta a_j^V. \quad (65)$$

The upper and lower bounds of the angular rates are $$\hat{\dot{\gamma}}_2 = -\frac{\hat{A}_{23}}{\sqrt{(\hat{V}_{21})^2 + (\hat{V}_{22})^2 + (\hat{V}_{23})^2}}, \quad (66)$$

$$\check{\dot{\gamma}}_2 = -\frac{\check{A}_{23}}{\sqrt{(\check{V}_{21})^2 + (\check{V}_{22})^2 + (\check{V}_{23})^2}},$$

$$\hat{\dot{\gamma}}_3 = \frac{\hat{A}_{32}}{\sqrt{(\hat{V}_{31})^2 + (\hat{V}_{32})^2}}, \check{\dot{\gamma}}_3 = \frac{\check{A}_{32}}{\sqrt{(\check{V}_{31})^2 + (\check{V}_{32})^2}}. \quad (67)$$

Again, a less efficient method to compute the upper and lower bounds of the angular rates is to find the maximum and minimum values for all combinations of errors, as shown in the following equations:

$$\hat{\dot{\gamma}}_2 = \text{Max} \left\{ \frac{(v_3^N \pm \Delta v_3^N)\{(v_1^N \pm \Delta v_1^N)(a_1^N \pm \Delta a_1^N) + (v_2^N \pm \Delta v_2^N)}{\sqrt{(v_1^N \pm \Delta v_1^N)^2 + (v_2^N \pm \Delta v_2^N)^2}} \right\}, \quad (68)$$

$$\hat{\dot{\gamma}}_3 = \text{Max} \left\{ \frac{(v_1^N \pm \Delta v_1^N)(a_2^N \pm \Delta a_2^N) - (v_2^N \pm \Delta v_2^N)(a_1^N \pm \Delta a_1^N)}{\{(v_1^N \pm \Delta v_1^N)^2 + (v_2^N \pm \Delta v_2^N)^2\}} \right\}, \quad (69)$$

$$\check{\dot{\gamma}}_2 = \text{Min} \left\{ \frac{(v_3^N \pm \Delta v_3^N)\{(v_1^N \pm \Delta v_1^N)(a_1^N \pm \Delta a_1^N) + (v_2^N \pm \Delta v_2^N)}{\sqrt{(v_1^N \pm \Delta v_1^N)^2 + (v_2^N \pm \Delta v_2^N)^2}} \right\}, \quad (70)$$

$$\check{\dot{\gamma}}_3 = \text{Min} \left\{ \frac{(v_1^N \pm \Delta v_1^N)(a_2^N \pm \Delta a_2^N) - (v_2^N \pm \Delta v_2^N)(a_1^N \pm \Delta a_1^N)}{\{(v_1^N \pm \Delta v_1^N)^2 + (v_2^N \pm \Delta v_2^N)^2\}} \right\}. \quad (71)$$

Two target maneuver detection methods will now be discussed in light of the above discussion. One of the methods is based on the acceleration components in the V frame, the other method is based on the flight path angular rates. Both methods can be used to detect a ballistic target's maneuver motion. As will be shown below, the advantage of the flight-path-angular-rates-based method is that it does not explicitly depend on the ballistic coefficient.

The target acceleration (actually deceleration) component due to drag only is $$a_D = \frac{Qg}{\beta} = \frac{\rho g v^2}{2\beta}, \quad (72)$$

where Q is the dynamic pressure, g is the gravity, β is the ballistic coefficient, and ρ is the air density. For a non-maneuvering target, the expected target acceleration due to drag and gravity only is $$\tilde{a} = -a_D e_1^V + g e_3^N = -\frac{\rho g v^2}{2\beta} e_1^V + g e_3^N. \quad (73)$$

With the help of Eq. (9) and Eq. (10), Eq. (73) can be expressed as $$\tilde{a} = g \left( \frac{v_3^N}{v} - \frac{\rho v^2}{2\beta} \right) e_1^V + \frac{gu}{v} e_3^V = \quad (74)$$

$$-\frac{\rho g v_1^N v}{2\beta} e_1^N - \frac{\rho g v_2^N v}{2\beta} e_2^N + g \left( 1 - \frac{\rho g v_3^N v}{2\beta} \right) e_3^N.$$

The expected non-maneuvering target acceleration components in the V frame and NED frame due to drag and gravity only are $$\tilde{a}_1^V = g \left( \frac{v_3^N}{v} - \frac{\rho v^2}{2\beta} \right), \tilde{a}_2^V = 0, \tilde{a}_3^V = \frac{gu}{v}, \quad (75)$$

$$\tilde{a}_1^N = -\frac{\rho g v_1^N v}{2\beta}, \tilde{a}_2^N = -\frac{\rho g v_2^N v}{2\beta}, \tilde{a}_3^N = g \left( 1 - \frac{\rho g v_3^N v}{2\beta} \right). \quad (76)$$

Therefore, the expected flight path angular rates due to drag and gravity only can be obtained by substituting Eq. (75) into Eq. (50) and Eq. (52). The results are $$\tilde{\dot{\gamma}}_2 = -\frac{\tilde{a}_3^V}{v} = -\frac{gu}{v^2}, \tilde{\dot{\gamma}}_3 = \frac{\tilde{a}_2^V}{u} = 0. \quad (77)$$

Note that the expected flight path angular rates in Eq. (77) do not depend explicitly on drag (or ballistic coefficient).

One can use the expected acceleration components in the V frame within limits to check target maneuvering. Let $a_2^V$ and $a_3^V$ be the computed acceleration from the filter measurements. For a non-maneuvering target, one can expect acceleration components in the V frame to fall within the upper and lower acceleration bounds as $$\check{\tilde{a}}_2^V \leq a_2^V \leq \hat{\tilde{a}}_2^V, \check{\tilde{a}}_3^V \leq a_3^V \leq \hat{\tilde{a}}_3^V, \quad (78)$$

where $$\hat{\tilde{a}}_2^V = \frac{\hat{V}_{21} \hat{A}_{22} - \hat{V}_{22} \hat{A}_{21}}{\sqrt{(\hat{V}_{21})^2 + (\hat{V}_{22})^2}}, \check{\tilde{a}}_2^V = \frac{\check{V}_{21} \check{A}_{22} - \check{V}_{22} \check{A}_{21}}{\sqrt{(\check{V}_{21})^2 + (\check{V}_{22})^2}}, \quad (79)$$

-continued $$\hat{a}_3^V = \frac{\left[(\hat{V}_{31})^2 + (\hat{V}_{32})^2\right]\hat{A}_{33} - \hat{V}_{33}(\hat{V}_{31}\hat{A}_{31} + \hat{V}_{32}\hat{A}_{32})}{\sqrt{(\hat{V}_{31})^2 + (\hat{V}_{32})^2}\sqrt{(\hat{V}_{31})^2 + (\hat{V}_{32})^2 + (\hat{V}_{33})^2}},$$ (80)

$$\check{a}_3^V = \frac{\left[(\check{V}_{31})^2 + (\check{V}_{32})^2\right]\check{A}_{33} - \check{V}_{33}(\check{V}_{31}\check{A}_{31} + \check{V}_{32}\check{A}_{32})}{\sqrt{(\check{V}_{31})^2 + (\check{V}_{32})^2}\sqrt{(\check{V}_{31})^2 + (\check{V}_{32})^2 + (\check{V}_{33})^2}},$$

$$\hat{V}_{ij} = v_j^N + \overline{G}_{ij}\Delta v_j^N \ (i=2,3;\ j=1,2,3),$$ (81)
$$\check{V}_{ij} = v_j^N - \overline{G}_{ij}\Delta v_j^N \ (i=2,3;\ j=1,2,3),$$

$$\hat{A}_{21} = \tilde{a}_1^N + \overline{H}_{21}\Delta a_1^N = -\frac{\rho g v_1^N v}{2\beta} + \overline{H}_{21}\Delta a_1^N,$$ (82)
$$\check{A}_{21} = \tilde{a}_1^N - \overline{H}_{21}\Delta a_1^N = -\frac{\rho g v_1^N v}{2\beta} - \overline{H}_{21}\Delta a_1^N,$$

$$\hat{A}_{22} = \tilde{a}_2^N + \overline{H}_{22}\Delta a_2^N = -\frac{\rho g v_2^N v}{2\beta} + \overline{H}_{22}\Delta a_2^N,$$ (83)
$$\check{A}_{22} = \tilde{a}_2^N - \overline{H}_{22}\Delta a_2^N = -\frac{\rho g v_2^N v}{2\beta} - \overline{H}_{22}\Delta a_2^N,$$

$$\hat{A}_{31} = \tilde{a}_1^N + \overline{H}_{31}\Delta a_1^N = -\frac{\rho g v_1^N v}{2\beta} + \overline{H}_{31}\Delta a_1^N,$$ (84)
$$\check{A}_{31} = \tilde{a}_1^N - \overline{H}_{31}\Delta a_1^N = -\frac{\rho g v_1^N v}{2\beta} - \overline{H}_{31}\Delta a_1^N,$$

$$\hat{A}_{32} = \tilde{a}_2^N + \overline{H}_{32}\Delta a_2^N = -\frac{\rho g v_2^N v}{2\beta} + \overline{H}_{32}\Delta a_2^N,$$ (85)
$$\check{A}_{32} = \tilde{a}_2^N - \overline{H}_{32}\Delta a_2^N = -\frac{\rho g v_2^N v}{2\beta} - \overline{H}_{32}\Delta a_2^N,$$

$$\hat{A}_{33} = \tilde{a}_3^N + \overline{H}_{33}\Delta a_3^N = g\left(1 - \frac{\rho g v_3^N v}{2\beta}\right) + \overline{H}_{33}\Delta a_3^N,$$ (86)
$$\check{A}_{33} = \tilde{a}_3^N - \overline{H}_{33}\Delta a_3^N = g\left(1 - \frac{\rho g v_3^N v}{2\beta}\right) - \overline{H}_{33}\Delta a_3^N,$$

$$G_{ij} = \frac{\partial a_i^V}{\partial v_j^N} \ (i=2,3;\ j=1,2,3),\ H_{ij} = \frac{\partial a_i^V}{\partial a_j^N} \ (i=2,3;\ j=1,2,3).$$ (87)

One can also use the flight path angular rates to check target maneuvering. Let $\dot{\gamma}_2$ and $\dot{\gamma}_3$ be the measured flight path angular rates from the filter measurements. For a non-maneuvering target, the measured flight path angular rates will be expected to fall within the expected upper and lower bounds of the flight path angular rates, i.e., $$\check{\dot{\gamma}}_2 \leq \dot{\gamma}_2 \leq \hat{\dot{\gamma}}_2,\ \check{\dot{\gamma}}_3 \leq \dot{\gamma}_3 \leq \hat{\dot{\gamma}}_3,$$ (88)
where $$\hat{\dot{\gamma}}_2 = -\frac{\hat{A}_{23}}{\sqrt{(\hat{V}_{21})^2 + (\hat{V}_{22})^2 + (\hat{V}_{23})^2}},$$ (89)

$$\check{\dot{\gamma}}_2 = -\frac{\check{A}_{23}}{\sqrt{(\check{V}_{21})^2 + (\check{V}_{22})^2 + (\check{V}_{23})^2}},$$

$$\hat{\dot{\gamma}}_3 = \frac{\hat{A}_{32}}{\sqrt{(\hat{V}_{31})^2 + (\hat{V}_{32})^2}},\ \check{\dot{\gamma}}_3 = \frac{\check{A}_{32}}{\sqrt{(\check{V}_{31})^2 + (\check{V}_{32})^2}},$$ (90)

$$\hat{V}_{ij} = v_j^N + \overline{M}_{ij}\Delta v_j^N \ (i=2,3;\ j=1,2,3),$$ (91)
$$\check{V}_{ij} = v_j^N - \overline{M}_{ij}\Delta v_j^N \ (i=2,3;\ j=1,2,3),$$

$$\hat{A}_{23} = \tilde{a}_3^V + \overline{N}_{23}\Delta a_3^V = \frac{gu}{v} + \overline{N}_{23}\Delta a_3^V,$$ (92)
$$\check{A}_{23} = \tilde{a}_3^V - \overline{N}_{23}\Delta a_3^V = \frac{gu}{v} - \overline{N}_{23}\Delta a_3^V,$$

$$\hat{A}_{32} = \tilde{a}_2^V + \overline{N}_{32}\Delta a_2^V = \overline{N}_{32}\Delta a_2^V,\ \check{A}_{32} = \tilde{a}_2^V - \overline{N}_{32}\Delta a_2^V = -\overline{N}_{32}\Delta a_2^V,$$ (93)

$$M_{ij} = \frac{\partial \dot{\gamma}_i}{\partial v_j^N} \ (i=2,3;\ j=1,2,3),\ N_{ij} = \frac{\partial \dot{\gamma}_i}{\partial a_j^V} \ (i=2,3;\ j=1,2,3).$$ (94)

The advantage of using flight path angular rates for target maneuver detection is that none of the equations depends explicitly on air density or ballistic coefficient. In the event that the ballistic coefficient is not available, the flight path angular rates can still be used for target maneuver detection.

A less efficient method is by using $$a_1^N = -\frac{\rho g v_1^N v}{2\beta},\ a_2^N = -\frac{\rho g v_2^N v}{2\beta},\ a_3^N = g\left(1 - \frac{\rho g v_3^N v}{2\beta}\right),$$ (95)

and Eq. (43)-Eq. (48) to estimate the upper and lower bounds of acceleration, or Eq. (68)-Eq. (71) to estimate the upper and lower bounds of the flight path angular rates.

Thus, two target maneuver detection methods are disclosed, one based on flight path angular rates and one based on acceleration. Both embodiments take into consideration measurement errors from the target measurement filters. Whether the target maneuver detection technique disclosed herein works properly or not depends on the measurement errors. If the measurement errors are too large, the expected bounds will be too large and the measured angular rates or accelerations due to maneuvering will erroneously fall inside the expected bounds. Therefore, the target maneuver detection technique disclosed herein can be used to set up the requirements for the filter measurement errors for a given maneuvering target.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method for determining whether a moving target is maneuvering, comprising:
   determining an expected motion for the target assuming the target is not maneuvering;

determining an upper bound and a lower bound for the expected motion; and
determining whether the actual motion exceeds at least one of the upper and lower bounds of the expected motion; wherein the above-recited acts are performed by a processor.

2. The computer-implemented method of claim 1, wherein determining the target's expected motion includes:
resolving the target's acceleration along the velocity frame of the target; and
determining the expected acceleration of the target from aerodynamic drag and gravity.

3. The computer-implemented method of claim 2, wherein determining whether the actual motion exceeds at least one of the upper and lower bounds includes determining whether the target's actual acceleration exceeds the expected acceleration due to aerodynamic drag and gravity.

4. The computer-implemented method of claim 1, wherein determining the upper and lower bounds includes determining the upper and lower bounds for the expected acceleration of the target from aerodynamic drag and gravity.

5. The computer-implemented method of claim 4, wherein determining the upper and lower bounds includes determining the upper and lower bounds from filter measurement uncertainties.

6. The computer-implemented method of claim 4, wherein determining whether the actual motion exceeds at least one of the upper and lower bounds includes determining whether the target's actual acceleration exceeds the expected acceleration due to aerodynamic drag and gravity.

7. The computer-implemented method of claim 1, wherein determining the target's expected motion includes determining the expected flight path angular rates due to gravity.

8. The computer-implemented method of claim 7, wherein determining the upper and lower bounds includes adding and subtracting the filter measurement uncertainties to and from, respectively, the expected flight path angular rates due to gravity.

9. The computer-implemented method of claim 8, wherein determining whether the actual motion exceeds at least one of the upper and lower bounds includes determining whether the actual flight path angular rates exceed the expected flight path angular rates.

10. The computer-implemented method of claim 7, wherein determining whether the actual motion exceeds at least one of the upper and lower bounds includes determining whether the actual flight path angular rates exceed the expected flight path angular rates.

11. The computer-implemented method of claim 1, wherein determining the upper and lower bounds includes combining a plurality of errors.

12. The computer-implemented method of claim 1, wherein determining the upper and lower bounds includes examining the gradient of the expected motion in a North-East-Down frame.

13. The computer-implemented method of claim 12, wherein examining the gradient of the expected motion includes examining the gradient of the target's acceleration in the velocity frame.

14. The computer-implemented method of claim 12, wherein examining the gradient of the expected motion includes examining the gradient of the flight path angular rates.

15. The computer-implemented method of claim 1, wherein determining whether the actual motion exceeds at least one of the upper and lower bounds of the expected motion includes a direct numerical comparison.

16. The computer-implemented method of claim 1, further comprising receiving data generated from a sensor sensing the actual motion of the target over time.

17. The computer-implemented method of claim 1, wherein the target is a ballistic target.

18. A computer readable program storage medium encoded with instructions that, when executed by a computing apparatus, perform a method for determining whether a moving target is maneuvering, the method comprising:
determining an expected motion for the target assuming the target is not maneuvering;
determining an upper bound and a lower bound for the expected motion; and
determining whether the actual motion exceeds at least one of the upper and lower bounds of the expected motion.

19. The computer readable program storage medium of claim 18, wherein determining the target's expected motion in the method includes:
resolving the target's acceleration along the velocity frame of the target; and
determining the expected acceleration of the target from aerodynamic drag and gravity.

20. The computer readable program storage medium of claim 19, wherein determining the upper and lower bounds in the method includes determining the upper and lower bounds for the expected acceleration of the target from aerodynamic drag and gravity.

21. The computer readable program storage medium of claim 18, wherein determining the target's expected motion in the method includes determining the expected flight path angular rates due to gravity.

22. The computer readable program storage medium of claim 21, wherein determining the upper and lower bounds in the method includes adding and subtracting the filter measurement uncertainties to and from, respectively, the expected flight path angular rates due to gravity.

23. The computer readable program storage medium of claim 18, wherein determining the upper and lower bounds in the method includes combining a plurality of errors.

24. The computer readable program storage medium of claim 18, wherein determining the upper and lower bounds in the method includes examining the gradient of the expected motion in a North-East-Down frame.

25. A computer-implemented method for determining whether a moving target is maneuvering, comprising:
resolving the target's acceleration along the velocity frame of the target assuming the target is not maneuvering;
determining the expected acceleration of the target from aerodynamic drag and gravity;
determining an upper bound and a lower bound for the expected acceleration of the target from aerodynamic drag and gravity of the expected motion; and
determining whether the actual motion exceeds at least one of the upper and lower bounds of the expected motion;
wherein the above-recited acts are performed by a processor.

26. The computer-implemented method of claim 25, wherein determining the upper and lower bounds includes determining the upper and lower bounds from filter measurement uncertainties.

27. The computer-implemented method of claim 25, wherein determining the upper and lower bounds includes combining a plurality of errors.

28. The computer-implemented method of claim 25, wherein determining the upper and lower bounds includes examining the gradient of the expected motion in a North-East-Down frame.

29. A computer-implemented method for determining whether a moving target is maneuvering, comprising:
   determining the expected flight path angular rates due to gravity assuming the target is not maneuvering;
   adding and subtracting the filter measurement uncertainties to and from, respectively, the expected flight path angular rates due to gravity to determine an upper bound and a lower bound for the expected motion; and
   determining whether the actual motion exceeds at least one of the upper and lower bounds of the expected motion;
   wherein the above-recited acts are performed by a processor.

30. The computer-implemented method of claim 29, wherein determining whether the actual motion exceeds at least one of the upper and lower bounds includes determining whether the actual flight path angular rates exceed the expected flight path angular rates.

31. The computer-implemented method of claim 29, wherein determining the upper and lower bounds includes combining a plurality of errors.

32. The computer-implemented method of claim 29, wherein determining the upper and lower bounds includes examining the gradient of the expected motion in a North-East-Down frame.

33. An apparatus, comprising:
   a processor;
   a bus system;
   a storage communicating with the processor over the bus system; and
   a software application residing on the storage that, when invoked by the processor, performs a method for determining whether a moving target is maneuvering, the method comprising:
      determining an expected motion for the target assuming the target is not maneuvering;
      determining an upper bound and a lower bound for the expected motion; and
      determining whether the actual motion exceeds at least one of the upper and lower bounds of the expected motion.

34. The apparatus of claim 33, wherein determining the target's expected motion in the method includes:
   resolving the target's acceleration along the velocity frame of the target; and
   determining the expected acceleration of the target from aerodynamic drag and gravity.

35. The apparatus of claim 34, wherein determining the upper and lower bounds in the method includes determining the upper and lower bounds for the expected acceleration of the target from aerodynamic drag and gravity.

36. The apparatus of claim 33, wherein determining the target's expected motion in the method includes determining the expected flight path angular rates due to gravity.

37. The apparatus of claim 36, wherein determining the upper and lower bounds in the method includes adding and subtracting the filter measurement uncertainties to and from, respectively, the expected flight path angular rates due to gravity.

38. The apparatus of claim 33, wherein determining the upper and lower bounds in the method includes combining a plurality of errors.

39. The apparatus of claim 33, wherein determining the upper and lower bounds in the method includes examining the gradient of the expected motion in a North-East-Down frame.

40. The apparatus of claim 33, further comprising a software component residing on the storage that receives command responsive to the determination.

41. The apparatus of claim 40, wherein the software component comprises either a guidance navigation control component or a targeting algorithm.

42. The apparatus of claim 33, further comprising a sensor for generating data on which the software application operates.

43. The apparatus of claim 33, further comprising a flight control mechanism controlled responsive to the determination by the software application.

44. The apparatus of claim 33, further comprising a weapon.

45. The apparatus of claim 44, wherein the weapon comprises a directed energy weapon.

* * * * *